United States Patent
Bury

(10) Patent No.: US 7,735,791 B2
(45) Date of Patent: Jun. 15, 2010

(54) SUPPORTING ARM WITH A SUCTION CUP AND A HOLDER FOR ATTACHING VARIOUS EQUIPMENT WITHIN A MECHANICAL LINKAGE

(75) Inventor: Henryk Bury, Mielec (PL)

(73) Assignee: Bury SP Z.O.O., Mielec (PL)

( * ) Notice: Subject to any disclaimer, the term of this patent is extended or adjusted under 35 U.S.C. 154(b) by 570 days.

(21) Appl. No.: 11/759,007

(22) Filed: Jun. 6, 2007

(65) Prior Publication Data

US 2008/0302946 A1 Dec. 11, 2008

(30) Foreign Application Priority Data

Jul. 21, 2006 (EP) .................. 06460023

(51) Int. Cl.
*A45D 42/14* (2006.01)
(52) U.S. Cl. .............. 248/205.5; 248/176.1; 248/181.1; 248/181.2; 248/276.1; 248/309.3
(58) Field of Classification Search .............. 248/309.1, 248/309.3, 205.5, 176.1, 181.1, 181.2, 276.1, 248/274.1, 288.31
See application file for complete search history.

(56) References Cited

U.S. PATENT DOCUMENTS

| 2005/0122424 A1 | 6/2005 | Overstreet | |
| 2006/0011795 A1* | 1/2006 | Dobbins | 248/276.1 |
| 2006/0113434 A1 | 6/2006 | Richter | |
| 2008/0116337 A1* | 5/2008 | Kaneda et al. | 248/205.8 |
| 2009/0127411 A1* | 5/2009 | Aguilar | 248/205.8 |
| 2009/0166497 A1* | 7/2009 | Carnevali | 248/309.4 |

FOREIGN PATENT DOCUMENTS

| EP | 0 050 079 | 4/1982 |
| EP | 1 571 045 | 9/2005 |
| EP | 1 598 487 | 11/2005 |
| GB | 2 412 254 | 9/2005 |

OTHER PUBLICATIONS

EPO Search Report dated Feb. 5, 2007 for priority EPO application No. 0640023.2.

* cited by examiner

*Primary Examiner*—Amy J. Sterling
(74) *Attorney, Agent, or Firm*—Brinks Hofer Gilson & Lione

(57) ABSTRACT

A supporting arm with a suction cup and a handle for attaching various equipment within a mechanical vehicle. The arm is composed of a suction cup, a push button, which slides within a housing, a rigid part, connected with the housing, and a hinging part, connected with the rigid part by means of a joint. The arm is provided with an elastic support for resting on a dashboard, which is situated opposite to the mounting joint of the suction cup under its hinged part, and with a ball joint, located above the elastic support and connected to the handle, which is fitted with an electrical connection.

6 Claims, 4 Drawing Sheets

SUPPORTING ARM WITH A SUCTION CUP AND A HOLDER FOR ATTACHING VARIOUS EQUIPMENT WITHIN A MECHANICAL LINKAGE

This application claims priority to European Patent Application No. 06460023.2, filed on Jul. 21, 2006, the entirety of which is incorporated by reference herein.

TECHNICAL FIELD

This invention relates to a supporting arm provided with a suction cup, for fastening the suction cup to a windshield of a mechanical vehicle and with a holder for attaching various electronic equipment, e.g. mobile phones, navigation screens etc., inside the mechanical vehicle.

BACKGROUND

Various electronic equipment e.g. mobile phones, TV screens, navigation monitors etc., have an extensive application in mechanical vehicles. These devices are sometimes fastened by suction cups to a windshield of the mechanical vehicle, but more often a reliable fastening to the dashboard of the mechanical vehicle is required. Suction cups can bear small loads only, and are usually ineffective for heavier loads.

European patent EP 1571045 describes a supporting arm for various electronic equipment, provided with a part for mounting the supporting arm to a suitable surface, a holder for mounting a device, and an oblong arm for connecting these parts together. The supporting arm is in the form of a flexible metal tube with corrugated walls and has a polygonal, preferably hexagonal cross-section, blinded on both sides with thick-walled bushings connecting it with the arm and the holder. The cross-section of bushings reflects the cross-section of the supporting arm. Bushings are fastened to the supporting arm so as these components do not turn against each other.

European patent EP 1598487 relates to a supporting element for sanitary ware, provided with a main member for mounting the supporting element to a surface, and a holder for mounting equipment, attached to the main member by a connecting element, which can be blocked or unblocked in any given position. The connecting element is provided with a joint element, which sets the supporting element in any convenient angular position.

European patent EP 1666308 discloses a support for various equipment, provided with a base and a stand with a mounting plate attached to it by a connector. The mounting plate includes an equipment holder. A jointed member is connected to the stand by a telescopic connection, which is blocked once a required position is determined. The mounting plate is connected by two-segment intermediate member to the jointed member, blocked in a required position.

Described above known designs of supports are inconvenient in certain applications, especially in mechanical vehicles, due to insufficient stability developing vibrations of the single-side-supported element. This is of great importance, especially in the case of heavier equipment attached to the support holder.

BRIEF SUMMARY

It is an objective of the disclosure to provide a supporting arm with a suction cup and a holder for mounting various electronic equipment within mechanical vehicles, which would ensure a stable mounting and supporting of this equipment, especially in the case of marked weight.

According to a representative embodiment a supporting arm is provided with a suction cup and a holder for mounting various electronic equipment within a mechanical vehicle, composed of one flexible and two or more connected parts, of which the last one is hinged. The supporting arm is characterized in that it is provided with an elastic support for resting on a dashboard, which is situated opposite to a mounting joint of the vacuum suction cup under its hinged part, and with a ball joint, located above the elastic support and connected to the handle, which is fitted with an electrical connection.

The elastic support of the arm comprises a plate made of an elastic material, preferably rubber, and it is attached to a lower surface of the hinging part of the supporting arm by means of a thrust plate.

In another representative embodiment, the joint connecting the rigid part of the arm with its hinging part, is provided with a blocking mechanism, which comprises a lever installed rotationally on a pivot of the joint and having, on its front surfaces surrounding a hole of the lever, an array of projections cooperating with a front cam on an internal surface of side walls of the rigid part. External surfaces of side walls of the hinged part and internal surfaces of side walls of the rigid part of the supporting arm are provided with an array of teeth cooperating with each other.

A cut-out is formed between side walls of the rigid part, wherein the size of the cut-out is slightly greater than the size of the lever. In the cut-out the lever is situated in the as-blocked position of the joint.

Further, the supporting arm is provided with a wiring system inside the rigid part and the hinged part, which is connected to the electrical connection and forms an antenna.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE PREFERRED EMBODIMENTS

Figure 1:
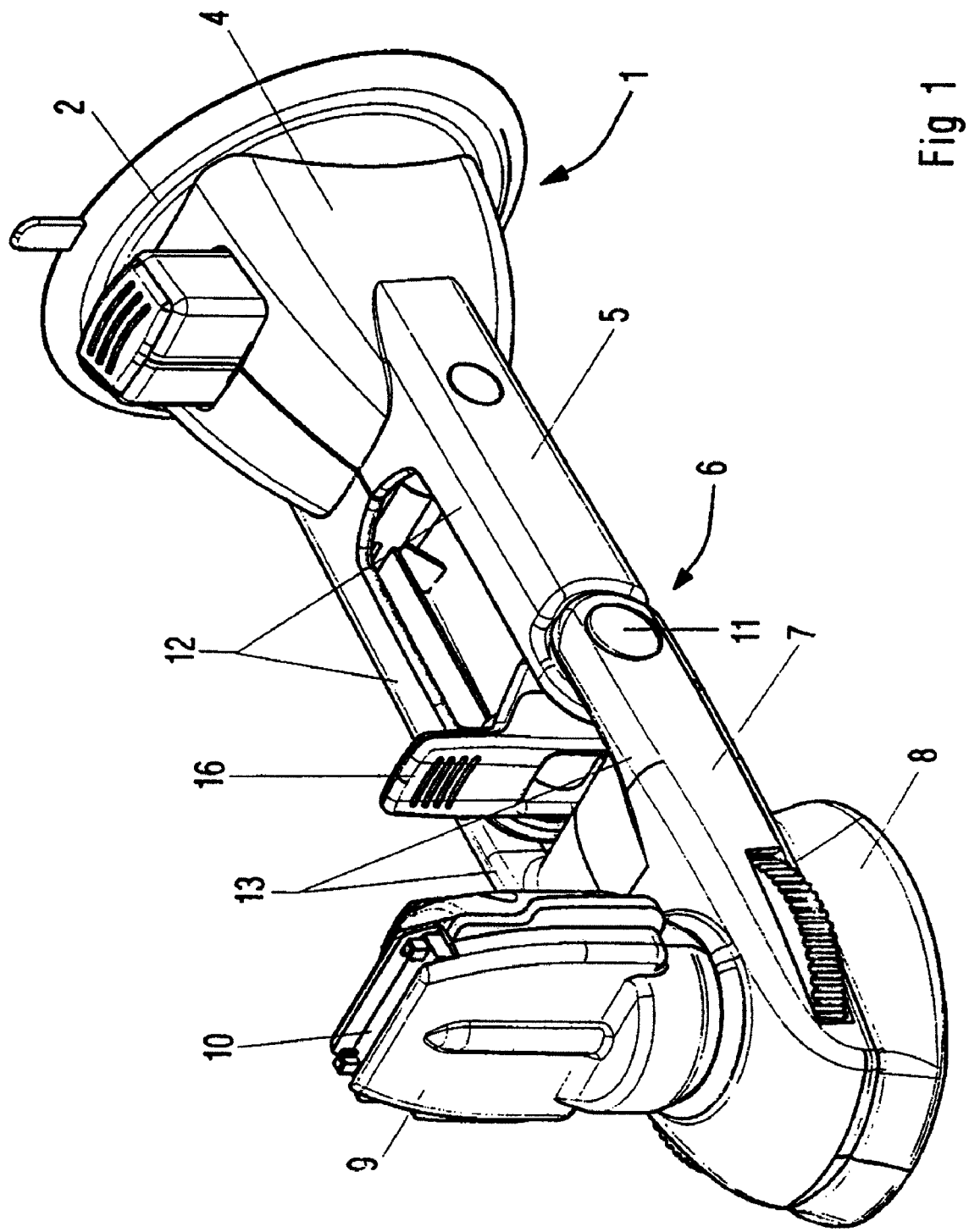
FIG. 1 is a perspective view of a supporting arm with a suction cup, a holder and a support when a joint is in the as-released position.

A supporting arm for mounting various electronic equipment within mechanical vehicles according to the invention comprises the following main parts: a suction cup 1 with an elastic cup 2 and a push button 3, which slides within a housing 4 and being used for fastening the housing 4 to a windshield, a rigid part 5, connected with the housing 4, and a hinging part 7, connected with the rigid part 5 by means of a joint 6. A support is mounted at the end of the hinging part 7 of the supporting arm.

At the end of the hinging part 7 of the supporting arm a holder 9 is installed, which can rotate freely. The holder 9 is fitted with an electrical connection 10 for connecting an electronic device mounted inside the holder 9 (not shown).

The joint 6 of the supporting arm comprises a pivot 11, passing through holes in side walls 12 of a rigid part 5 of the supporting arm, which are covered by side walls 13 of the hinged part 7 of the supporting arm. There are teeth 14 and 15 of a joint blocking mechanism, protruding from side walls 12 of the rigid part 5 and from side walls 13 of the hinging part 7. Additionally, the blocking mechanism is provided with a lever 16, which includes external surfaces that are provided with protrusions 17 cooperating with a front cam 18 extending from internal surfaces of side walls 12 of the rigid part 5 of the supporting arm.

The blocking mechanism of the supporting arm according to the invention can take one of two positions. One of the positions is an upright position of the lever 16, where between protrusions 17 of the lever 16 the corresponding cut-outs of the front cam mesh, which ensure sufficient clearance between side surfaces of the lever 16 and internal surfaces of side walls 12 of the rigid part 5 of the arm, and also sufficient clearance between the teeth 14 and 15 of side walls 12 and 13. At such position of the lever 16 it is easy to turn the hinged part 7 of the supporting arm around the pivot 6 or set any relative angular position of the rigid part 5 and hinging part 7 of the supporting arm.

Figure 2:
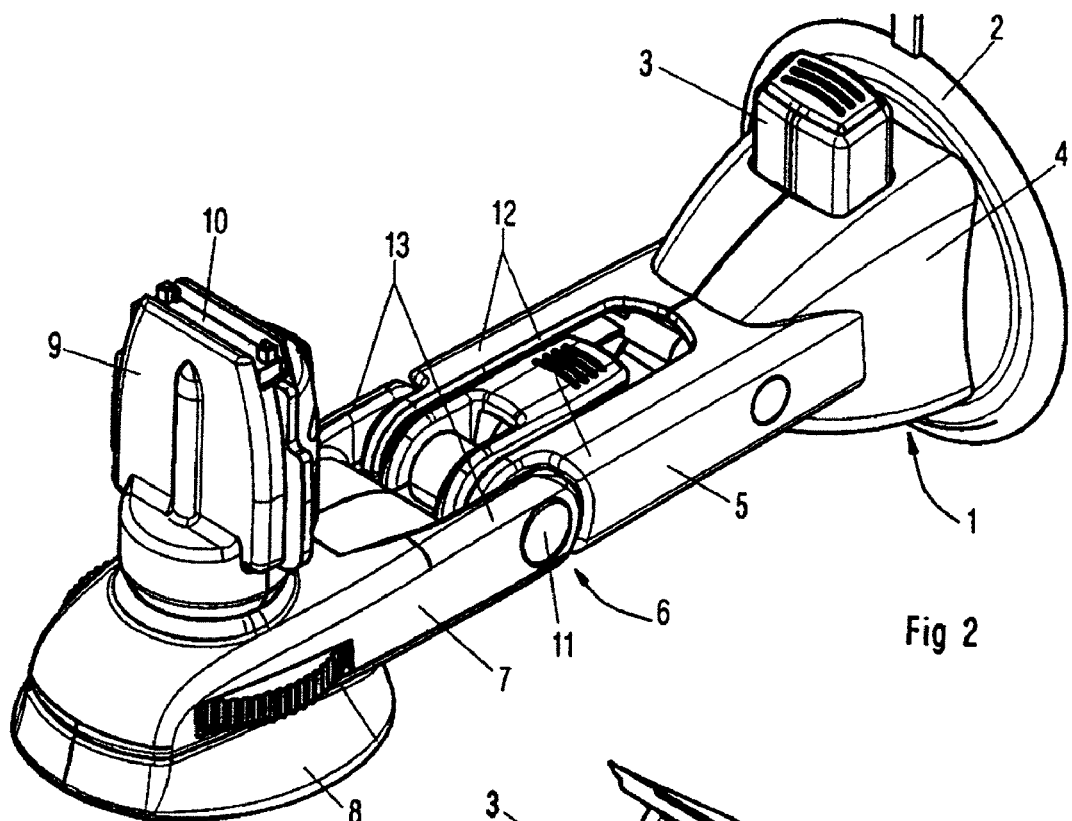
FIG. 2 is a perspective view of the arm of FIG. 1 when the joint is in the as-blocked position.
Figure 3:
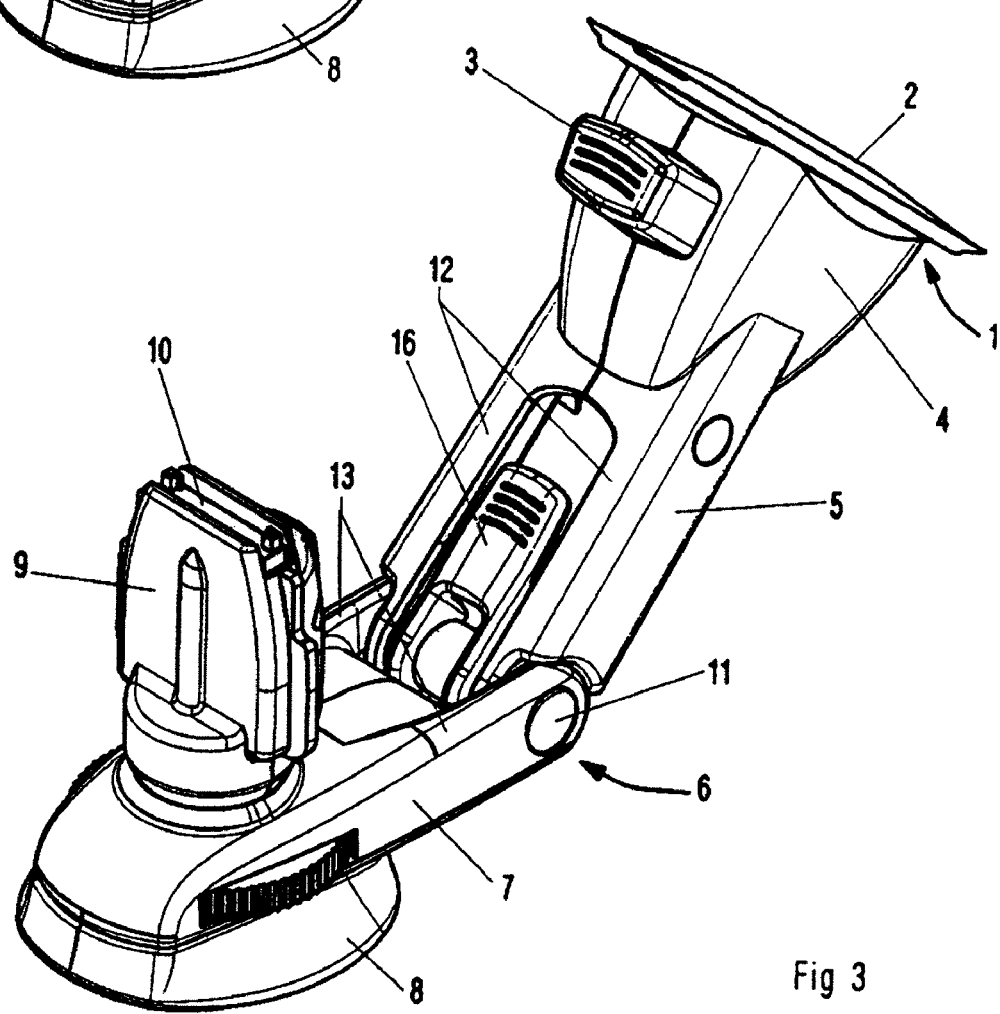
FIG. 3 is a perspective view of the arm of FIG. 1 when a rigid and hinged arms are bent off, so as the support precisely adheres to a dashboard of a vehicle when the joint is in the as-blocked position.
Figure 4:
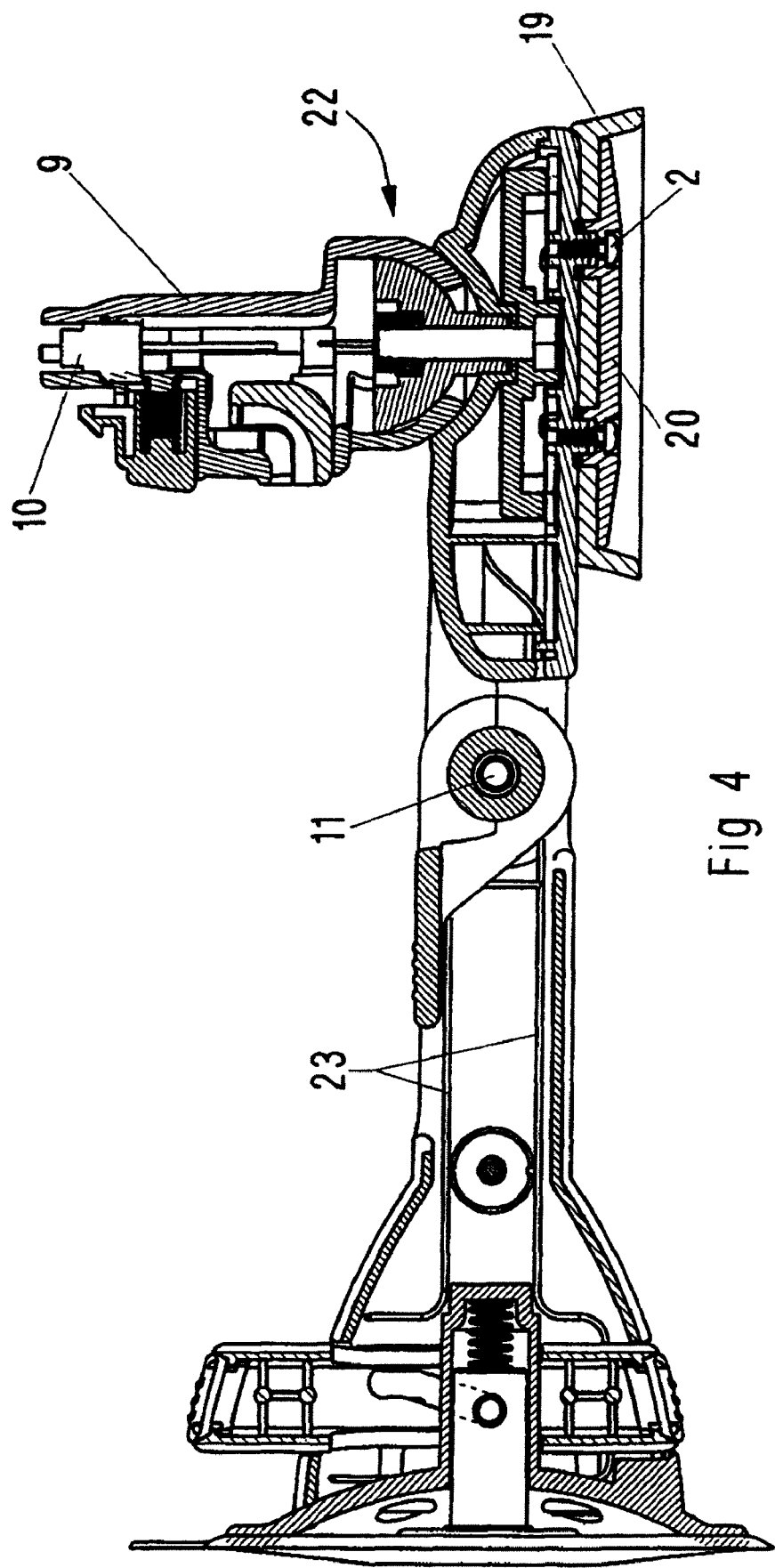
FIG. 4 is a cross-sectional view of the arm of FIG. 1.
Figure 5:
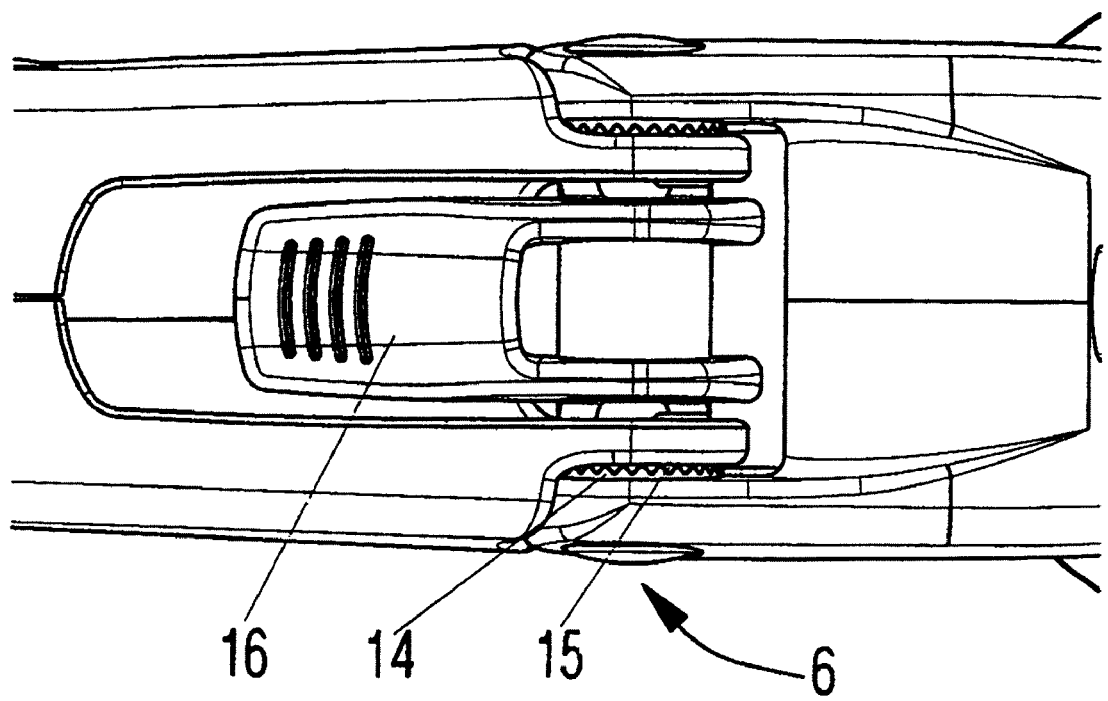
FIG. 5 is a plan view of a joint blocking mechanism.
Figure 6:
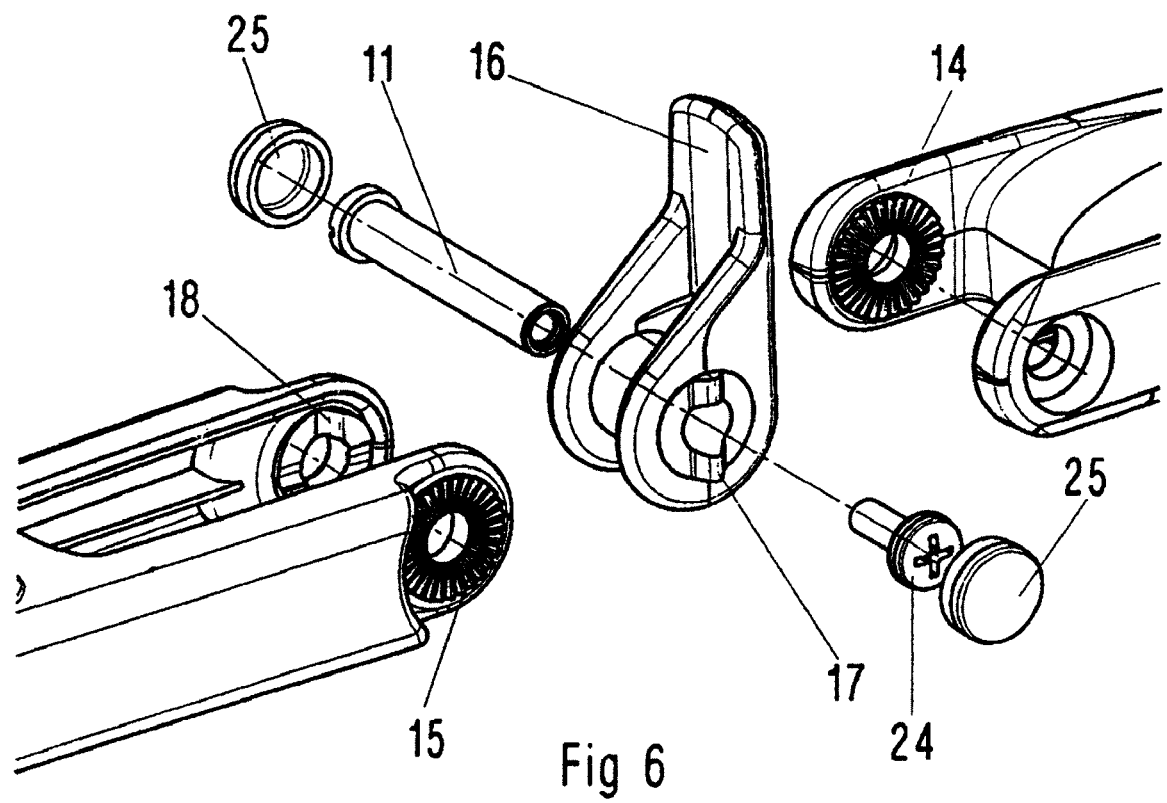
FIG. 6 is an explored view of the joint blocking mechanism.

In the second position of the blocking mechanism of the supporting arm, as shown in FIGS. 2 and 3, the lever 16 is in the as-blocked position, where it is hidden in the cut-out between side walls 12 of the rigid part 5 of the supporting arm. At such position, protrusions 17 of the lever press the protrusions of the front cam 18, making side walls 12 of the rigid part 5 of the arm to expand. Simultaneously, teeth 14 on side walls 12 of the rigid part 5 of the arm press against teeth 15 in side walls 13 of the hinging part 7, making it blocked in the established position. Thus, at such position of the lever 16 the joint 6 is blocked, preventing rotation of the hinging part 7 in relation to the rigid part 5.

The elastic support 8 of the supporting arm according to the invention is composed of a rubber plate 19, compressed by a thrust plate 20 and screws 21 being fastened to the hinging part 7 of the arm.

At the end of the hinging part 7 of the supporting arm there is a ball joint 22, attached to the holder 9 and fitted with an electrical connection 10. The electrical connection 10 is connected to the wiring system 23, which extends along the rigid part 5 and hinging part 7 of the supporting arm, and plays a role of an antenna.

The antenna composed of the wiring system 23 is used for receiving radio waves, as well as the digital communication and other radio/TV signal broadcasting stations etc.

Fastening of the supporting arm within the mechanical vehicle is performed in the following manner. Prior to fastening of the arm, one has to rise the lever 16 into the upright position and release at the same time the joint 6. Then it is necessary do push the suction cup 1 against the windshield of the mechanical vehicle in the place selected in such a way, that the elastic support 8 will rest freely on the dashboard of the mechanical vehicle. An angle between the rigid part 5 and the hinging part 7 can be selected freely, depending on the dashboard geometry in relation to the windshield, i.e. the position of both the suction cup 1 and the elastic support 8.

Once the suction cup 1 is fastened, it is necessary to block the joint 6 by turning the lever 16 to the horizontal position, when it is completely hidden in the cut-out made between side walls 12 of the rigid part 5 of the supporting arm.

As the arm is supported by the elastic support 8, which rests over the external surface of the dashboard, a user gets sufficiently durable and rigid mounting of the electronic device placed on the holder 9. Due to the antenna made of the wiring system 23, it is possible to receive any radio frequencies trough the supporting arm. The radio signal is conveyed by the electric connection 10 to the electronic device place in the holder 9 of the suction cup.

The invention is not limited to the embodiments disclosed herein. Within the scope of the invention different modifications or alternations will be conceivable to those skilled in the art.

The invention claimed is:

1. A supporting arm with a suction cup and a handle for attaching various equipment within a mechanical vehicle, comprising a flexible member and a first connected member and a second connected member, the second connected member is hinged, further comprising an elastic support for resting on a dashboard, the elastic support being situated opposite a mounting joint of said suction cup under the hinged part, and comprising a ball joint located above said elastic support and connected to said handle, wherein said handle is fitted with an electrical connection.

2. A supporting arm according to claim 1, wherein said elastic support further comprises a plate made of an elastic material and is attached to a lower surface of said hinged part of said supporting arm with a thrust plate.

3. A supporting arm according to claim 1, wherein said joint connecting the rigid part of the arm with the hinged part further comprises a blocking mechanism that comprises a lever installed rotationally on a pivot of said joint and an array of projections cooperating with a front cam on an internal surface of side walls of said rigid part disposed on its front surfaces surrounding a hole of said lever, wherein external surfaces of the side walls of said hinged part and internal surfaces of the side walls of said rigid part of said supporting arm comprise an array of teeth cooperating with each other.

4. A supporting arm according to claim 3, wherein a cut-out is defined between said side walls of said rigid part, wherein a size of said cut-out is slightly greater than a size of said lever being situated in said cut-out in the as-blocked position of said joint.

5. A supporting arm according to claim 1, further comprising a wiring system inside said rigid part and said hinged part that is connected to said electrical connection, wherein the wiring system defines an antenna.

6. The supporting arm according to claim 2, wherein the plate is made from rubber.

* * * * *